United States Patent
Maiville

(10) Patent No.: US 10,302,232 B2
(45) Date of Patent: May 28, 2019

(54) SELF SEALING END FITTING

(71) Applicant: Eaton Corporation, Cleveland, OH (US)

(72) Inventor: Randolph L. Maiville, Onondaga, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/561,217

(22) PCT Filed: Mar. 31, 2016

(86) PCT No.: PCT/US2016/025198
§ 371 (c)(1),
(2) Date: Sep. 25, 2017

(87) PCT Pub. No.: WO2016/161077
PCT Pub. Date: Oct. 6, 2016

(65) Prior Publication Data
US 2018/0066778 A1  Mar. 8, 2018

Related U.S. Application Data

(60) Provisional application No. 62/142,716, filed on Apr. 3, 2015.

(51) Int. Cl.
*F16L 29/02* (2006.01)
*F16L 57/04* (2006.01)
*F16L 37/28* (2006.01)

(52) U.S. Cl.
CPC .............. *F16L 29/02* (2013.01); *F16L 57/04* (2013.01); *F16L 37/28* (2013.01); *F16L 2201/20* (2013.01)

(58) Field of Classification Search
CPC . F16L 29/02; F16L 57/04; F16L 37/28; F16L 2201/20
(Continued)

(56) References Cited

U.S. PATENT DOCUMENTS 2,973,211 A * 2/1961 Osborn ............... F16L 37/0848
251/149.6
5,423,515 A * 6/1995 Ozaki ..................... F16L 37/40
251/149.6

(Continued)

FOREIGN PATENT DOCUMENTS

GB           1247812 A      9/1971

OTHER PUBLICATIONS

International Search Report, PCT/US2016/025198, dated Jul. 13, 2016.
(Continued)

*Primary Examiner* — Angelisa L Hicks
(74) *Attorney, Agent, or Firm* — Fishman Stewart PLLC

(57) ABSTRACT

A self-sealing end fitting includes a valve, an adaptor, and a connector. The valve may define a longitudinal axis and may include a first end portion, a second end portion, a flange disposed therebetween, and a central bore. The adaptor may have a first end portion surrounding at least the second end portion of the valve, and the connector may surround at least the first end portion of the valve. A portion of the connector, a portion of the flange, and a portion of the first end portion of the adaptor may define a pocket. The valve may be configured to move axially relative to the adaptor. In embodiments, a sealing surface of the flange may contact a corresponding sealing surface of the first end portion of the adaptor to form a first seal within the pocket, and the first seal may comprise a metal-to-metal seal.

22 Claims, 3 Drawing Sheets

(58) Field of Classification Search
USPC .................................................... 251/149.6
See application file for complete search history.

(56) References Cited

U.S. PATENT DOCUMENTS

| 7,111,641 B2 | 9/2006 | Marban et al. |
| 2004/0031942 A1 | 2/2004 | Perrine et al. |

OTHER PUBLICATIONS

Article: Low Profile, Self-Sealing Hydraulic "B" Nuts, Aeroquip Corporation 1991, 2 pages.
Aricle: Parker, Single Shut-Off Couplings for the Aerospace Industry, Catalong 106-SSOC Mar. 2000, 9 pages.

* cited by examiner

SELF SEALING END FITTING

CROSS-REFERENCE TO RELATED APPLICATION

This application claims priority to International Patent Application No. PCT/US2016/025198, filed Mar. 31, 2016, which claims the benefit to U.S. Provisional Application Ser. No. 62/142,716, filed Apr. 3, 2015, the contents of both are incorporated by reference in their entireties.

TECHNICAL FIELD

The present disclosure relates generally to fluid distribution systems, including self-sealing end fittings for fluid distribution systems.

BACKGROUND

Fluid couplings are commonly used in many industries for connecting sections of hoses with fittings. Some fluid couplings are "self-sealing" in that they automatically prevent fluid from escaping one side of the coupling upon disconnection. Such couplings can be referred to as "self-sealing end fittings," "self-sealing B-nuts," or "one side self-sealing couplings." Such fittings are typically used in hydraulic systems and can be used with operating pressures of up to 5000 psi. These fittings typically include a female end that can mate together with a male end (e.g., a standard male fitting) to form a seal and to permit fluid to flow freely from one section to the other (and/or vice versa). Fluid couplings may include a mechanism for connection and disconnection of the male and female ends with standard tools or, in other instances, a mechanism quick-disconnect mechanism to allow for connection and disconnection of the male and female ends without the need for any tools.

In some fluid distribution systems, the fluid is hazardous, unclean, flammable, and/or dangerous, making release into the atmosphere undesirable. During fluid distribution activities, such as, for example, and without limitation, routine maintenance of the fluid distribution systems, it may be desirable to limit fluid loss and/or release. Accordingly, it may be desirable to connect and disconnect the male and female ends of the couplings with limited and/or little to no release (i.e., spillage) of fluid.

To prevent such release, fluid couplings may be provided with a valve element that translates axially from a closed position to an open position upon connection of the male and female ends. Such fluid couplings may be referred to as "self-sealing," as the valve element can obstruct (or otherwise prevent) the fluid flow through the coupling upon disconnection of the male and female ends and/or from one or more sides of the connection.

Many industries, such as the aerospace industry, are requiring fluid couplings to have certain fire protection ratings. For example, some require the fluid couplings to be fire resistant for five minutes, and some require the couplings to be fireproof for fifteen minutes. Therefore, it may be desirable, among other things, to design a fluid coupling that is fire resistant and/or fireproof (per industry standards).

Fluid couplings typically use elastomeric seals to seal potential leak paths. However, during a fire, elastomeric seals may heat up (due to conduction of heat from surrounding elements) and could fail. Among other things, the instant disclosure seeks to improve upon the aforementioned challenges.

SUMMARY

Embodiments of a self-sealing end fitting are disclosed. Embodiments of a self-sealing end fitting include a valve, an adaptor, and a connector. The valve may define a longitudinal axis and may include a first end portion, a second end portion, a flange disposed therebetween, and a central bore disposed axially. The adaptor may have a first end portion surrounding at least the second end portion of the valve, and the connector may surround at least the first end portion of the valve. A portion of the connector, a portion of the flange, and a portion of the first end portion of the adaptor may define a pocket, and may include a biasing member. The valve may be configured to move axially relative to the adaptor. In embodiments, a sealing surface of the flange of the valve may contact a corresponding sealing surface of the first end portion of the adaptor to form a first seal within the pocket, and the first seal may comprise a metal-to-metal seal.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the instant disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure.

Figure 1:
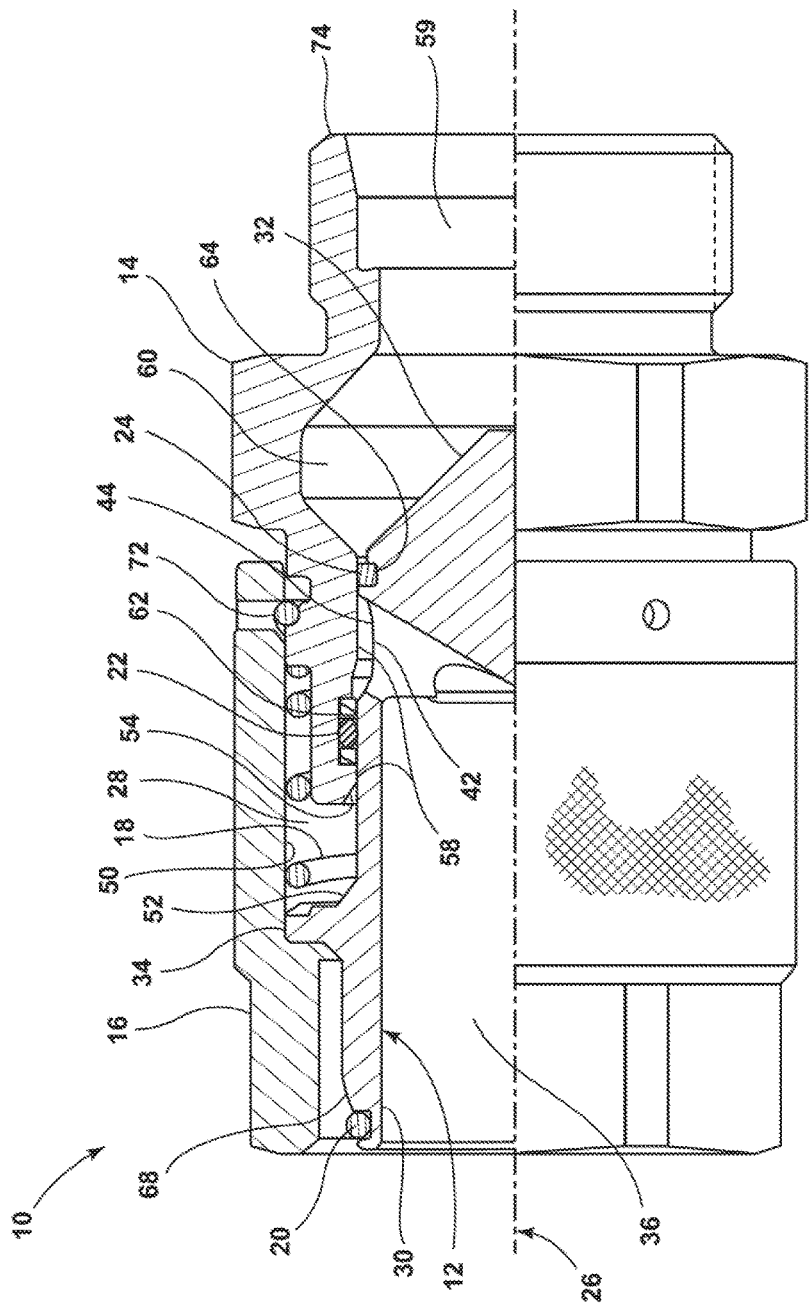
FIG. 1 is a cross-sectional view of a self-sealing end fitting in a closed position according to an embodiment of the present disclosure.
Figure 2:
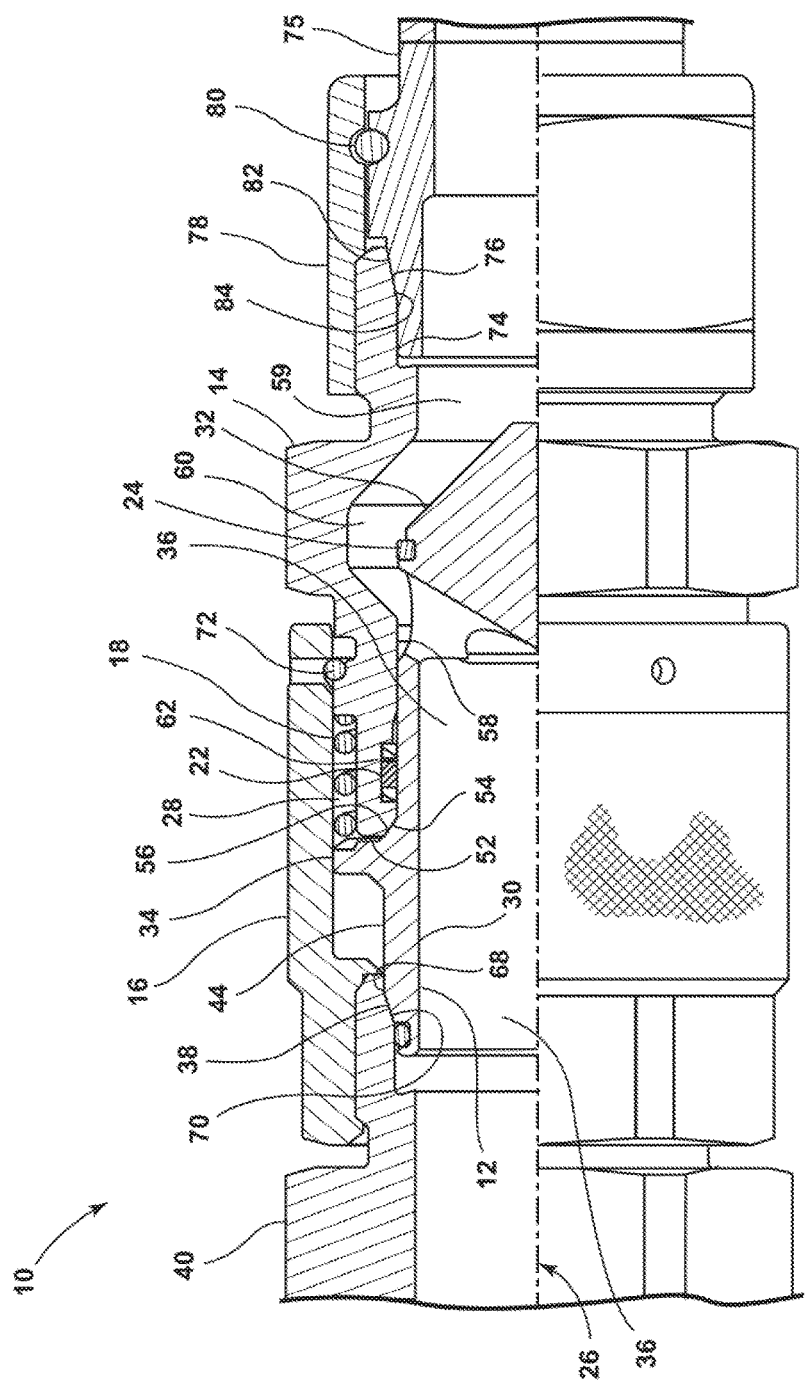
FIG. 2 is a cross-sectional view of the self-sealing end fitting of FIG. 1 in an open position.

Referring now to FIG. 1, a self-sealing end fitting 10 according to an embodiment is generally illustrated. Fitting 10 may include a valve 12, an adaptor 14, a connector 16, a biasing member 18, and one or more seals (e.g., seals 20, 22, 24). Valve 12 may define or be disposed along a longitudinal axis 26, and may be configured to move axially to and from a closed position (e.g., FIG. 1) and an open position (e.g., FIG. 2). Valve 12 may be configured to obstruct and/or prevent fluid flow in the closed position (FIG. 1) and to permit fluid flow in the open position (FIG. 2). Valve 12 may be biased in the closed position (FIG. 1) via a biasing member 18. In embodiments, the biasing member 18 may comprise a spring or other resilient mechanical biasing device. The biasing member 18 may be disposed or provided at least partially within a pocket 28 (which may be a recess) that may be formed or defined by portions of connector 16, valve 12, and adaptor 14. In a particular embodiment, biasing member 18 may be in contact with (e.g., compressed between) portions of adaptor 14 and valve 12, and may provide an axial force that is predominantly applied in a direction parallel to the longitudinal axis 26.

Valve 12 may include end portions 30, 32, a flange 34 disposed therebetween, and a central bore 36 disposed axially through which fluid may be permitted to flow. End portion 30 may be generally cylindrical in shape and may be configured to form a metal-to-metal seal (e.g., provided at or about 38) with another fitting or hose 40 (shown included in FIG. 2). In embodiments, such as generally illustrated in FIG. 1, end portion 32 of valve 12 may have a cross-sectional shape that is generally triangular. End portion 32 may also include an opening 42 in communication with an outer surface 44 of valve 12. Bore 36 and opening 42 may be fluidly connected such that fluid may travel to and from bore 36 and opening 42. Flange 34 may extend radially outwardly to contact a surface of connector 16 (i.e., an inner surface 50 of connector 16). As generally illustrated embodiments depicted in FIGS. 1 and 2, as valve 12 moves axially relative to adaptor 14, flange 34 correspondingly moves axially within pocket 28. Flange 34 may include a sealing surface 52 which may contact a corresponding sealing surface 54 of adaptor 14 to form a metal-to-metal seal 56 and/or a seal with an elastomer backup (for example, as described further in connection with FIG. 2). In some embodiments, valve 12 may be comprised of, for example and without limitation, titanium, aluminum and/or steel.

With continued reference to the exemplary embodiment illustrated in FIG. 1, adaptor 14 may generally surround a portion of valve 12. In the illustrated embodiment, adaptor 14 circumferentially surrounds opening 42 and end portion 32 of valve 12, and an inner surface 58 of adaptor 14 may touch or abut an outer surface 44 of valve 12. Adaptor 14 may include a bore 59 and/or a recess 60. A portion of the recess 60 may generally correspond in shape to at least a portion of the end portion 32 of valve 12. In the illustrated embodiment, because end portion 32 of valve 12 includes a cross-sectional shape that may be said to be generally triangular, recess 60 may include a portion with a cross-sectional shape that may also be said to be generally, for example, as generally illustrated in FIG. 1. One of ordinary skill in the art will understand, however, that the concept is not limited to the specific configurations and shapes illustrated, and various configurations and shapes may be used (for end portion 32 of valve 12 and recess 60 of adaptor 14) to permit valve 12 to move freely to/from the closed and open positions, while allowing fluid to flow through valve 12 when in the open position. Adaptor 14 may further include a recess 62 in which a seal 22 may be provided. In an embodiment, seal 22 may act as a dynamic seal; i.e., as valve 12 moves axially relative to adaptor 14, seal 22 may remain in operative contact with outer surface 44 of valve 12. As such, a dynamic seal may be configured to prevent fluid from flowing past seal 22 into pocket 28, whether valve 12 is in the open or closed position. Such fluid flow represents a potential leak path which the instant disclosure seeks to significantly reduce or prevent through, at least, the inclusion of a metal-to-metal seal (e.g., generally shown at position 56 in FIG. 2). In some embodiments, adaptor 14 may be comprised of, for example and without limitation, titanium, aluminum, and/or steel.

In the absence of an opposing force sufficient to overcome the force applied by biasing member 18 onto valve 12, valve 12 may generally be in the closed position (FIG. 1). As such, when fitting 10 is detached from other fittings or hoses 40 (e.g., as generally depicted in FIG. 2), valve 12 may generally be in the closed position. In the closed position, fluid is impeded or prevented from flowing through opening 42 of valve 12 into bore 36 of valve 12. A seal 24 of fitting 10 may be configured to prevent fluid from flowing from bore 59 of adaptor 14, through opening 42 of valve 12, and into bore 36 of valve 12. As generally illustrated in the exemplary embodiment, seal 24 may be disposed within a channel 64 of end portion 32 of valve 12 and may abut an inner surface 58 of adaptor 14. In embodiments, seals (such as illustrated seals 20, 22, and 24) may be elastomeric and may be comprised of nitrile, ethylene propylene, fluorocarbon or other suitable elastomers.

Referring to FIG. 2, valve 12 may be configured to move axially relative to adaptor 14 to provide an open position (such as generally illustrated). Because valve 12 may be biased to a closed position, a force must generally be applied to valve 12 to distribute fluid through or past valve 12. To move valve 12 in an open position, an opening force may be provided, for example, by a component such as a fitting or hose 40. As generally illustrated in FIG. 2, a fitting 40 (which may include an external threaded portion) may be connected to (e.g., threaded into) connector 16 (which may have a corresponding internal threaded portion) and may be abutted against outer surface 44 of valve 12 to hold valve 12 in an open position. Such connection may serve to create a metal-to-metal seal (e.g., at position 38) between a surface 68 of valve 12 and a surface 70 of fitting 40. The disclosed concept is not limited to the illustrated configurations of the metal-to-metal seals and, as persons of skill in the art will understand, surfaces 68 and 70 may be designed to interface or interact in other ways to provide a suitable metal-to-metal seal in connection with the disclosure. In the illustrated embodiment, surfaces 68 and 70 are angled in mating fashion, relative to axis 26 (including common industry standards for angles that may be 8.5 degrees, 24 degrees, 37 degrees, or 45 degrees). In other embodiments, however, surfaces 68, 70 may be provided in an operative mating fashion that may be perpendicular (relative to the outer surfaces of valve 12 and fitting 40) or curved. The connection of fitting 40 with valve 12 may be facilitated by connector 16 which (once fitting 40 is inserted over end portion 30 of valve 12) may surround end portion 30 of valve 12 and fitting 40. In an embodiment, connector 16 may comprise a hexagonal nut. Fitting 10 may include a wire 72 or other operative component/connector that may be configured to drive the fitting 40 toward valve 12 as connector 16 is rotated in a first direction (e.g., clockwise), and away from valve 12 as connector 16 is rotated in a second direction opposite of first direction (e.g., counter-clockwise).

With further reference to FIG. 2, as valve 12 moves axially relative to adaptor 14, biasing member 18 may compress, and seal 22 may remain within recess 62 of adaptor 14, while continuing to prevent fluid from flowing into pocket 28. To prevent fluid leaking, valve 12 and adaptor 14 may form a metal-to-metal seal (e.g. at or about position 56) upon arriving at the open position. In the illustrated embodiment, surface 52 of valve 12 contacts a corresponding surface 54 of adaptor 14 to form metal-to-metal seal (e.g., at or about position 56). One of ordinary skill in the art will understand that there are several ways to form a metal-to-metal seal, and/or other suitable seal, between valve 12 and adaptor 14 within pocket 28. For example, and without limitation, in the illustrated embodiment, surfaces 52, 54 are configured to be angled in mating fashion, relative to axis 26. In embodiments, industry standards for angles, such as 8.5 degrees, 24 degrees, 37 degrees, or 45 degrees, may be employed. In other embodiments, however, surfaces 52, 54 may be perpendicular (relative to the outer circumferential surfaces of valve 12 and adaptor 14) or curved in mating fashion. In operation, a torque applied to connector 16 (sometimes referred to as the "pre-load") may be transferred to surface 68 of valve 12 as it contacts adaptor 14. Therefore, the torque applied in connecting fitting 40 with fitting 10 may be utilized, at least in part, to form metal-to-metal seal (e.g., at or about position 56). In some embodiments, fitting 40 may have a diameter of ⅜ inch to 1½ inches. In other embodiments, fitting 40 may have a diameter, for example, of about ¼ inch to about 1½ inch. However, the concept is not necessarily limited to such ranges, and other suitable dimensions may also be employed. In embodiments, fitting 40 may have a diameter of 1 inch and, for example and without limitation, the torque applied to connector 16 may be about 100 ft-lbs. As valve 12 moves into the open position, end portion 32 of valve 12 may become axially aligned with recess 60 of adaptor 14. As such, fluid may be permitted to flow over seal 24 through opening 42 since seal 24 no longer abuts inner surface 58 of adaptor 14.

In embodiment, an end portion 74 of adaptor 14 may be configured for connection to another fitting or hose 75 to form a metal-to-metal seal (e.g., at or about position 76). The fitting or hose to which end portion 74 is connected may be similar in shape and/or function as end portion 30 of valve 12. A generally shown in the illustrated embodiment, a connector 78 may circumferentially surround at least a portion of fitting 75 and end portion 74 of adaptor 14. A wire 80 (or other suitable component) may drive the fitting 75 toward adaptor 14 as connector 78 is rotated in a first direction (e.g., clockwise) and away from adaptor 14 as connector 78 is rotated in a second direction opposite of first direction (e.g., counter-clockwise). One of ordinary skill in the art will understand that there are several ways to form a metal-to-metal seal (e.g., at or about position 76) between adaptor 14 and fitting 75. In the illustrated embodiment, surfaces 82, 84 of fitting 75 and adaptor 14, respectively, may be angled in mating fashion (which may include industry standards for angles, such as 8.5 degrees, 24 degrees, 37 degrees, or 45 degrees). In other embodiments, however, surfaces 82, 84 may be perpendicular (relative to the outer circumferential surfaces of fitting 75 and adaptor 14, respectively) or curved in a mating fashion.

When valve 12 moves axially from the open position to the closed position, seal 24 of valve 12 again contacts inner surface 58 of adaptor 14 and, thus, prevents fluid flow past seal 24 (into bore 36 from bore 59, or vice versa). In this sense, fitting 10 is "self-sealing" since it will automatically seal when fitting 10 is disconnected from fitting 40.

Figure 3B:
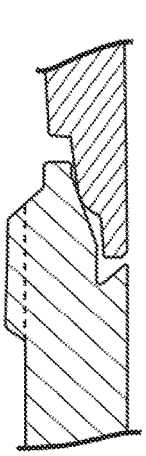
FIGS. 3A-3C illustrate graphical cross-sectional representations associated with the formation of metal-to-metal seals.
Figure 3C:
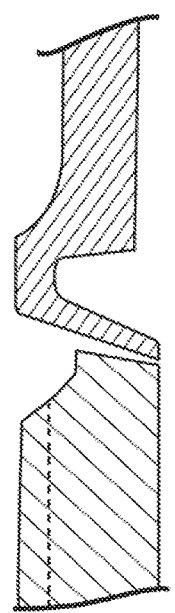
Figure 3A:
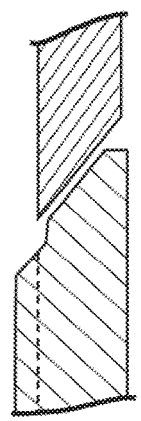

FIGS. 3A-3C generally illustrate graphical cross-sectional representations associated with the formation of metal-to-metal seals (such as those provided at or about positions 38, 56, 76) in the illustrated exemplary embodiments. FIG. 3A generally illustrates a form of an angle-to-angle seal. FIG. 3B generally illustrates a form of a radius-and-angle seal. FIG. 3C generally illustrates a form of a beam seal. Again, those of skill in the art will readily understand that other specific dimensions and configurations may be employed to provide metal-to-metal seals in connection with the disclosed teachings.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A self-sealing end fitting comprising:
   a valve defining a longitudinal axis and including a first end portion, a second end portion, a flange disposed between the first end portion and the second end portion, and an axially disposed central bore;
   an adaptor having a first end portion surrounding at least the second end portion of the valve; and
   a connector surrounding at least the first end portion of the valve,
   wherein a portion of the valve, a portion of the connector, and a portion of the first end portion of the adaptor define a pocket; the valve is configured to move axially relative to the adaptor; a sealing surface of the flange contacts a corresponding sealing surface of the first end portion of the adaptor to form a first seal within the pocket; the first seal comprises a metal-to-metal seal; wherein a sealing surface of the flange and a corresponding sealing surface of the adaptor are angled in mating fashion at a substantially common acute angle relative to the longitudinal axis.

2. The self-sealing end fitting of claim 1, wherein a length of the sealing surface of the adaptor is shorter than a length of the sealing surface of the flange; and the self-sealing end fitting is configured as a quick-disconnect fitting.

3. The self-sealing end fitting of claim 1, including a second seal disposed within a recess of the adaptor, the second seal configured to abut an outer surface of the valve proximate to the pocket between the flange and the second end portion of the valve.

4. The self-sealing end fitting of claim 3, wherein an opening of the valve is disposed between the flange and the second end portion of the valve proximate to the second seal.

5. The self-sealing end fitting of claim 3, including a third seal disposed in the second end portion of the valve, the third seal configured to abut an inner surface of adaptor when the self-sealing end fitting is in a closed position.

6. The self-sealing end fitting of claim 3, wherein the recess of the adaptor and the valve define a chamber and a size of the chamber remains substantially constant in open and closed positions of the valve.

7. The self-sealing end fitting of claim 1, including a second seal, wherein the second seal comprises a metal-to-metal seal.

8. The self-sealing end fitting of claim 7, including a third seal, wherein the third seal comprises a metal-to-metal seal.

9. The self-sealing end fitting of claim 1, wherein the valve includes an open position and a closed position; the first seal is formed in the open position; the valve is configured to form, at least when the valve is in the open position, a second metal-to-metal seal with a first fluid conduit; and the adaptor is configured to form, at least when the valve is in the open position, a third metal-to-metal seal with a second fluid conduit.

10. The self-sealing end fitting of claim 1, wherein the second end portion of the valve is aligned with a recess formed within an inner surface of the adaptor when the self-sealing end fitting is in an open position, such that a fluid is permitted to flow between a central bore of the adaptor and the central bore of the valve via an opening of the valve.

11. The self-sealing end fitting of claim 1, wherein the self-sealing end fitting is fire resistant.

12. The self-sealing end fitting of claim 1, wherein in an open position of the valve, the pocket is disposed on a first side of the flange; the connector and the valve define a second pocket disposed on an opposite side of the flange from the pocket.

13. The self-sealing end fitting of claim 1, wherein the flange extends radially outwardly to contact an inner surface of the connector.

14. The self-sealing end fitting of claim 1, including a biasing member configured to bias the valve toward a closed position and the biasing member is disposed at least partially in the pocket.

15. The self-sealing end fitting of claim 14, wherein the biasing member comprises a spring and at least some of the adaptor and at least some of the valve are disposed radially inside of the biasing member.

16. A self-sealing end fitting comprising:
a valve defining a longitudinal axis and including a first end portion, a second end portion, a flange disposed between the first end portion and the second end portion, and an axially disposed central bore;
an adaptor having a first end portion surrounding at least the second end portion of the valve; and
a connector surrounding at least the first end portion of the valve,
wherein a portion of the valve, a portion of the connector, and a portion of the adaptor define a pocket; the valve is configured to move axially relative to the adaptor and the flange is configured to correspondingly move with the valve axially within the pocket; a sealing surface of the flange contacts a corresponding sealing surface of the first end portion of the adaptor to form a first seal within the pocket; a second seal is disposed within a recess of the adaptor, the second seal configured to abut an outer surface of the valve proximate to the pocket between the flange and second end portion of the valve; and the first seal is a metal-to-metal seal and at least one of the valve and the adaptor are configured for an additional metal-to-metal seat;
wherein the sealing surface of the flange and the corresponding sealing surface of the first end portion of the adaptor are angled in mating fashion at a substantially common acute angle relative to the longitudinal axis.

17. The self-sealing end fitting of claim 16, wherein the metal-to-metal seal associated with the first seal includes titanium, aluminum, or steel and the metal-to-metal seal associated with the additional seal includes titanium, aluminum, or steel.

18. The self-sealing end fitting of claim 16, including a third seal disposed in the second end portion of the valve, the third seal configured to abut an inner surface of adaptor when the self-sealing end fitting is in a closed position.

19. The self-sealing end fitting of claim 16, wherein a sealing surface of the valve and a corresponding sealing surface of the adaptor are angled in mating fashion relative to the longitudinal axis.

20. The self-sealing end fitting of claim 16, including a biasing member configured to bias the valve to a closed position.

21. The self-sealing end fitting of claim 16, wherein the valve includes an opening disposed at an outer surface of the valve, the opening being fluidly connected to the central bore of the valve.

22. The self-sealing end fitting of claim 16, wherein the second end portion of the valve is aligned with a recess formed within an inner surface of the adaptor when the self-sealing end fitting is in an open position, such that a fluid is permitted to flow between a central bore of the adaptor and the central bore of the valve via an opening of the valve.

* * * * *